US012775405B2

(12) United States Patent
Palmer

(10) Patent No.: US 12,775,405 B2
(45) Date of Patent: Oct. 27, 2026

(54) DATA TYPE BASED WRITE MANAGEMENT TECHNIQUES

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 13 days.

(21) Appl. No.: 18/511,807

(22) Filed: Nov. 16, 2023

(65) Prior Publication Data

US 2024/0184463 A1 Jun. 6, 2024

Related U.S. Application Data

(60) Provisional application No. 63/429,735, filed on Dec. 2, 2022.

(51) Int. Cl.
*G06F 3/06* (2006.01)

(52) U.S. Cl.
CPC .......... *G06F 3/0626* (2013.01); *G06F 3/0659* (2013.01); *G06F 3/0679* (2013.01)

(58) Field of Classification Search
CPC .... G06F 3/0626; G06F 3/0659; G06F 3/0679; G06F 3/061; G06F 3/064
See application file for complete search history.

(56) References Cited

U.S. PATENT DOCUMENTS

| | | | | |
|---|---|---|---|---|
| 10,991,387 | B1 * | 4/2021 | Balasubramaniam | G11B 5/4813 |
| 2011/0161563 | A1 * | 6/2011 | Chang | G06F 12/0246 |
| 2013/0114354 | A1 * | 5/2013 | Ryu | G11C 7/00 |
| 2016/0179371 | A1 * | 6/2016 | Sinclair | G06F 3/064 |
| 2017/0285948 | A1 * | 10/2017 | Thomas et al. | G06F 3/0616 |
| 2018/0260154 | A1 * | 9/2018 | Dronamraju | G06F 3/0689 |
| 2019/0095116 | A1 * | 3/2019 | Igahara | G06F 3/0634 |
| 2020/0401334 | A1 * | 12/2020 | Saxena | G06F 3/064 |
| 2021/0216446 | A1 * | 7/2021 | Yang | G11C 16/3495 |
| 2022/0197508 | A1 * | 6/2022 | Kanteti | G06F 3/064 |

* cited by examiner

*Primary Examiner* — Arpan P. Savla
*Assistant Examiner* — Jason Michael Pinga
(74) *Attorney, Agent, or Firm* — Holland & Hart LLP

(57) ABSTRACT

Methods, systems, and devices for data type based write management techniques are described. A memory system may store (e.g., multiplex) different subsets of logical data types into the same data blocks and later separate the different types of logical data into respective data blocks. For example, the memory system may write each logical data type to a certain type of memory cell. The memory system may write different logical data types to the same type of memory cell and later separate them into the respective data blocks. For example, the memory system may write first data of a first logical data type and second data of a second logical data type to the same data block if both logical data types are associated with storage to the same type of memory cell and subsequently transfer the first data and second data to respective data blocks.

19 Claims, 6 Drawing Sheets

DATA TYPE BASED WRITE MANAGEMENT TECHNIQUES

CROSS REFERENCE

The present Application for Patent claims priority to and the benefit of U.S. Provisional Patent Application No. 63/429,735 by Palmer, entitled "DATA TYPE BASED WRITE MANAGEMENT TECHNIQUES," filed Dec. 2, 2022, assigned to the assignee hereof, and is expressly incorporated by reference in its entirety herein.

TECHNICAL FIELD

The following relates to one or more systems for memory, including data type based write management techniques.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
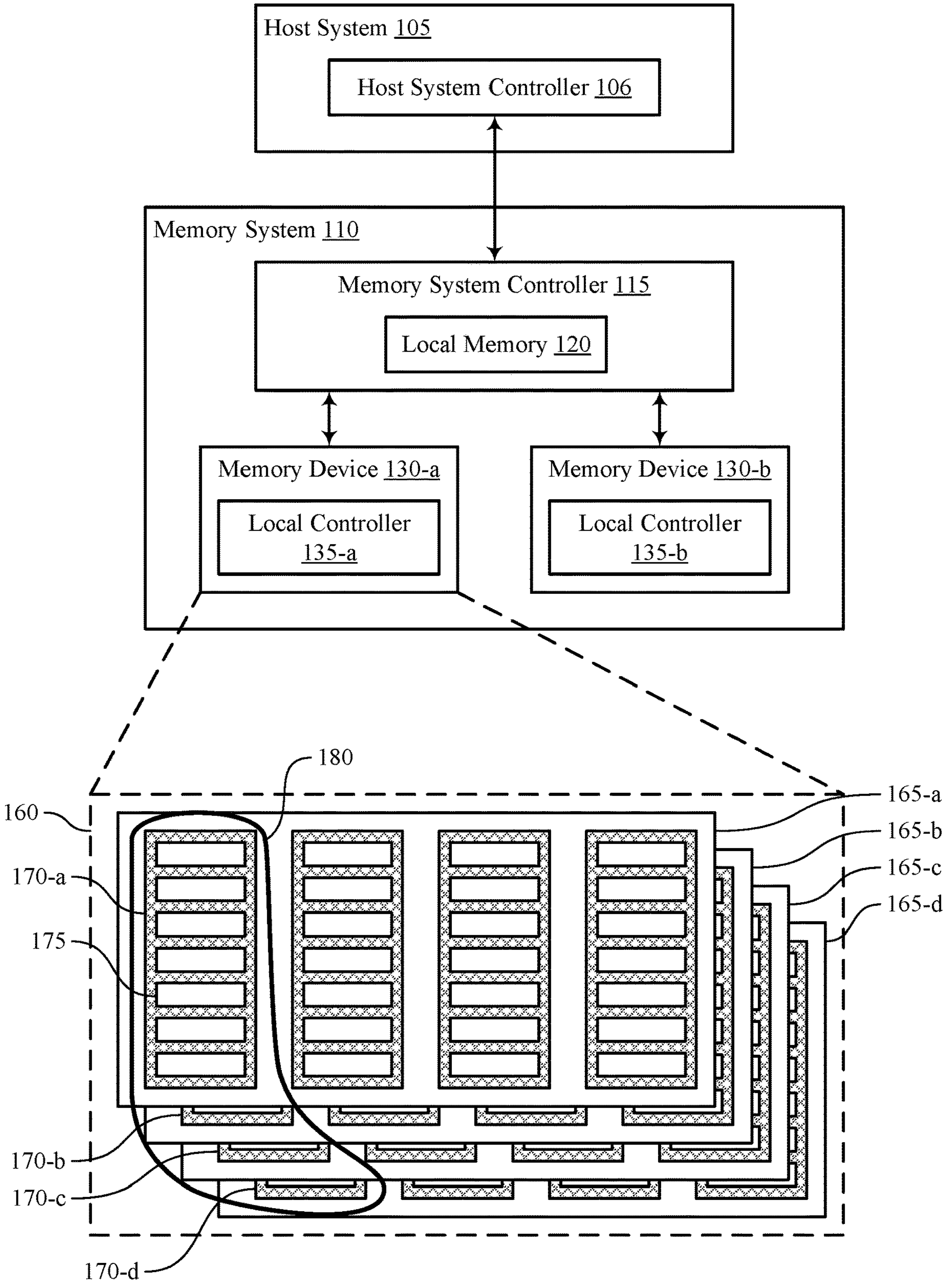
FIG. 1 illustrates an example of a system that supports data type based write management techniques in accordance with examples as disclosed herein.

A memory system may support storage of various types of data. The data may be sorted into respective (e.g., dedicated) data blocks (e.g., a physical block, a virtual block) based at least in part on a logical type of the data. For example, logical data of a first type (e.g., tables and system information, small fragment cursor data, hot data, cold data, write booster data, among other types of logical data) may be written to a first data block, logical data of a second type may be written to a second data block, and so on. To support the writing of logical data into a respective data block, the memory system may maintain one or more spare data blocks (e.g., empty data blocks, erased data blocks, data blocks storing no data) for each logical data type. The memory system may write data to the one or more spare data blocks in case the respective data block is filled (e.g., each page of the data block has been written to). In some cases, however, the memory system may maintain an increasing quantity of spare data blocks as the quantity of logical data types continues to increase. Increased spare data block quantities and maintenance may add to the overhead and cost of the memory system as it may increase the number of blocks utilized to maintain a functioning system (e.g., support the accessing of data according to respective logical data types).

In accordance with examples described herein, a memory system may store (e.g., multiplex) different subsets of logical data types into the same data blocks and later separate the different types of logical data into respective data blocks (e.g., as part of a media management operation, such as a garbage collection operation). For example, the memory system may write each logical data type to a certain type of memory cell (e.g., static single level cell (SLC), dynamic SLC, triple-level cell (TLC)). In some cases, the memory system may write different logical data types to the same type of memory cell and later separate the different logical data types into the respective data blocks (e.g., where each type of memory cell corresponds to a respective subset of logical data types). For example, the memory system may write first data of a first logical data type and second data of a second logical data type to the same block if both logical data types are associated with storage to the same type of memory cell. As part of a media management operation, the memory system may subsequently separate and transfer the first data and the second data type to respective data blocks.

As a result, the memory system may maintain a reduced quantity of spare data blocks (e.g., reduced from the quantity of logical data types to the quantity of different types of memory cells) compared to other different techniques. For example, spare data blocks may be maintained to support the initial writing of data (e.g., updated data), but may be unnecessary to support the media management operation. Thus, the quantity of spare data blocks available for initial writing may be reduced. The reduced quantity of spare data blocks will reduce the cost of the memory system, reduce a die size associated with the memory system by reducing the quantity of data blocks, allow for more data blocks to be used for data instead of being reserved for possible use for spare data, facilitate the handling of new logical data types that may be supported by the memory system, other applications, or any combination thereof, among other benefits.

In addition to applicability in memory systems as described herein, techniques for type-based write management may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by reduce the cost of the memory system, reduce a die size associated with the memory system by reducing the quantity of data blocks, allowing for more data blocks to be used for data instead of being reserved for possible use for spare data, and facilitating the handling of new logical data types that may be supported by the memory system, among other benefits.

Figure 2:
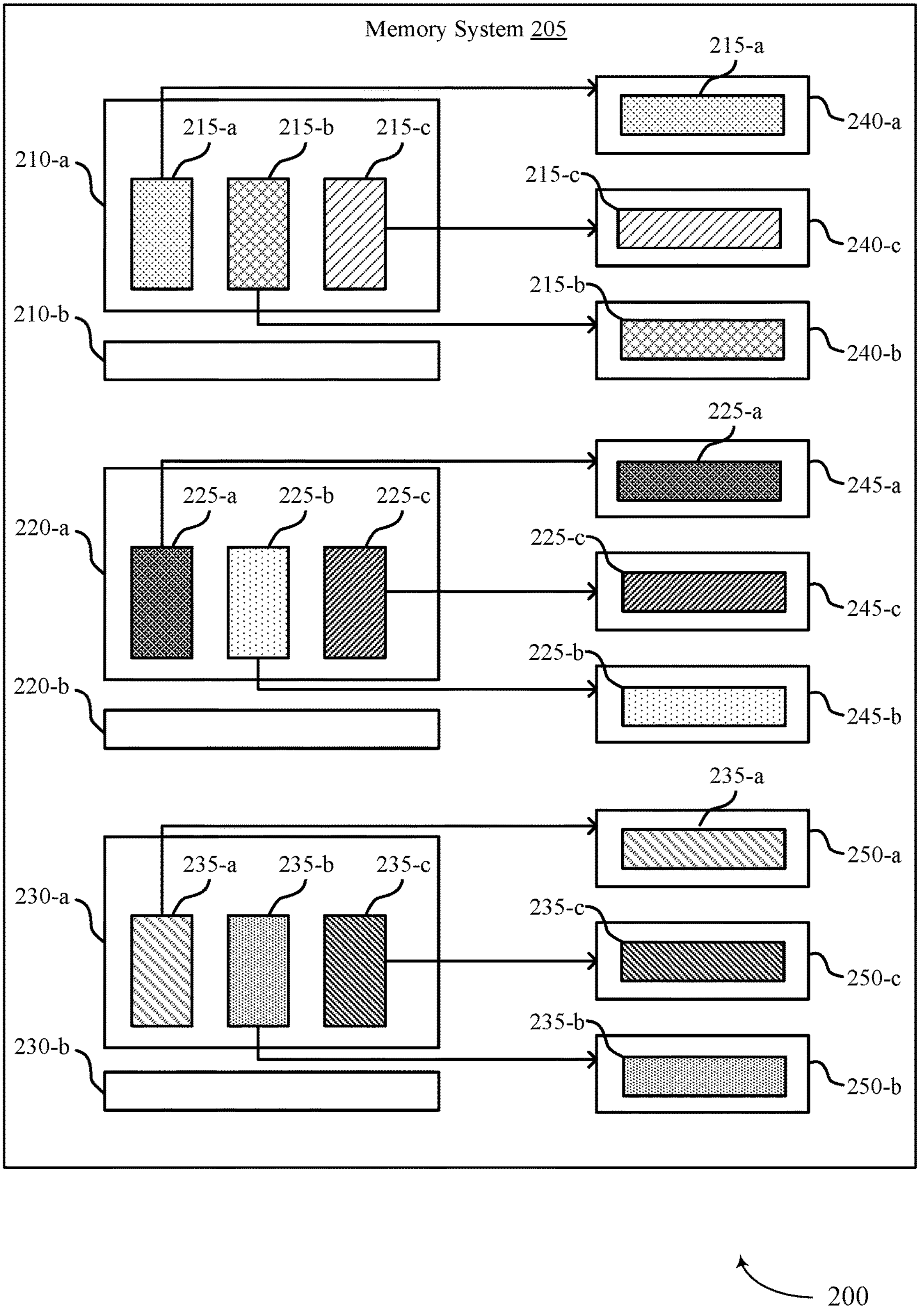
FIG. 2 illustrates an example of a system that supports data type based write management techniques in accordance with examples as disclosed herein.

Features of the disclosure are initially described in the context of systems with reference to FIGS. 1 and 2. Features of the disclosure are additionally described in the context of data management diagrams with reference to FIGS. 3A through 4B. These and other features of the disclosure are further illustrated by and described in the context of an apparatus diagram and flowchart that relate to data type based write management techniques with reference to FIGS. 5 and 6.

FIG. 1 illustrates an example of a system 100 that supports data type based write management techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or any combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more array's of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new; valid block 170 rather than the old, invalid block 170). In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support data type based write management techniques. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may multiplex different subsets of logical data types into same data blocks (e.g., blocks 170, virtual blocks 180) and later separate the different types of logical data into respective data blocks (e.g., as part of a media management operation such as a garbage collection operation). For example, the memory system 110 may write various types of logical data with each type of logical data being associated with (e.g., being stored to) a certain type of memory cell. In some cases, the memory system 110 may write different logical data types to the same type of memory cell and later separate them into the respective data blocks (e.g., where each type of memory cell corresponds to a respective subset of logical data types). In some examples, the memory system 110 may write a first data of a first logical data type and second data of a second logical data type to the same data block if both logical data types are associated with storage to the same type of memory cell. The memory system 110 may subsequently transfer the first data and the second data to respective data blocks from the data block to which the first and second data were written (e.g., multiplexed).

As a result, the memory system 110 may maintain a reduced quantity of spare data blocks (e.g., reduced from the quantity of logical data types to the quantity of different types of memory cells). The reduced quantity of spare data blocks will reduce the cost of the memory system 110, reduce a size of a die 160 associated with the memory system 110 by reducing the quantity of data blocks, facilitate the handling of new logical data types that may be supported by the memory system 110, or any combination thereof, among other benefits.

FIG. 2 illustrates an example of a system 200 that supports data type based write management techniques in accordance with examples as disclosed herein. The system 200 may be an example of a system 100 as described with reference to FIG. 1, or aspects thereof. The system 200 may include a memory system 205. The system 200 may implement aspects of the system 100 as described with reference to FIG. 1. For example, the memory system 205 may be an example of a memory system 110 described with reference to FIG. 1.

The memory system 205 may write data to any quantity of data blocks (e.g., data blocks 210, 220, 230). The data blocks may include memory cells configured to store data of the memory system 205. The memory system 205 may include different types of memory cells, such as static SLCs, dynamic SLCs, or multiple-level memory cells (e.g., TLCs), among others. A static SLC may be a memory cell configured to store a single bit of data and associated with a first access latency. A dynamic SLC may be a memory cell configured to store a single bit of data and associated with a second access latency that is less than the first access latency. In some examples, static SLCs may be associated with a higher reliability than dynamic SLCs (e.g., static SLCs may be accessed with relatively lower error rates than dynamic SLCs). A TLC may be a memory cell configured to store three bits of data and associated with a third access latency that is greater than the first access latency. In some examples, a same memory cell may function as a different type of memory cell at different times based on how the memory cell is operated. That is, a same physical memory cell accessed in accordance with a given set of trim parameters corresponding to a given type of memory cell may function as the corresponding type of memory cell. If the same memory cell is accessed in accordance with a different set of trim parameters corresponding to a different type of memory cell, the memory cell may function as the different type of memory cell.

A data block may be associated with a given type of memory cell. That is, the memory cells included in a given data block may be configured and accessed as a same type of memory cell. In some examples, a data block may be associated with different types of memory cells at different times (e.g., after erasure, the memory cells may be configured and accessed as a different type of memory cell).

The memory system 205 may support the storage of different types of logical data. Different logical types of data may include, but are not limited to, cold user data (e.g., data associated with a first likelihood of being overwritten within a duration after being written), hot user data (e.g., data associated with a second likelihood of being overwriting within the duration that is greater than the first likelihood), user defined data (e.g., user defined logical unit numbers (LUNs), user defined partitions, user defined zones), internal system data (e.g., with high performance and endurance such as mapping table data), internal data for operating firmware of the memory system 205 (e.g., with high reliability and lower performance), swap data (e.g., with lower reliability and high performance), redundant array of independent NAND (RAIN) parity data of varying kinds (e.g., including different protection for SLC, TLC, QLC, static, dynamic, and other kinds), among others.

In some cases, the memory system 205 may write the different types of logical data to a different type of data block (e.g., a respective group of data blocks associated with respective type of memory cell). That is, in some cases, the memory system 205 may write each type of logical data to a respective data block configured to store the type of logical data. For instance, for user defined zone data, the range of LBAs of the memory system 205 may be divided into respective zones. The different zones may be associated with different data blocks. That is, data logically written to different zones may be written to different corresponding data blocks. In some other examples, the memory system 205 may maintain dedicated data blocks for: various UFS data types (e.g., EM1 and EM2), internal firmware data, table data (e.g., L2P mapping table data), UFS replay protected memory block (RPMB) data, dynamic SLC UFS write booster data, SLC caching, RAIN swap space, or any combination thereof, among other types of logical data for which dedicated data blocks may be maintained.

In some cases, data may be sorted into (e.g., initially written to) respective data blocks based on a logical type of the data. For example, the memory system 205 may write first data associated with a first logical data type to a first data block, second data associated with a second logical data type to a second data block, and so on. Although depicted in FIG. 2 as individual data blocks for illustrative purposes, a data block may represent any quantity of physical or virtual data blocks.

In cases where logical data is initially sorted and written to respective data blocks, the memory system 205 may maintain one or more spare data blocks for each logical data type to support such sorting and separation. A spare data block may be an empty data block (e.g., a data block storing no data, an erased data block) associated with a respective data block. For instance, with reference to FIG. 2, the data block 210-*a* may be associated with a spare data block 210-*b*, the data block 220-*a* may be associated with a spare data block 220-*b*, and the data block 230-*a* may be associated with a spare data block 230-*b*. In cases where the logical data is initially written to respective data blocks, the memory system 205 may write logical data of the same type to one or more spare blocks if the respective data block is filled (e.g., or reaches a threshold). For example, in writing data to a data block, the memory system 205 may use a cursor, where a cursor corresponds to a position (e.g., address) within the data block to which to write the data. To support continuity of write service, a spare data block may be maintained to write remaining data to the data block when an associated data block is filled (e.g., when the cursor reaches an end of the data block). For example, if data has been written to the data block 210-*a* such that the data block 210-*a* excludes empty pages of memory cells (e.g., the cursor reaches an end of the data block 210-*a*, is filled such that all pages of memory cells of the data block 210-*a* have been written to), the memory system 205 may write remaining data to the spare block 210-*b* (e.g., without interruption to the write operation due to the availability of the spare block 210-*b*).

However, as the quantity of logical data types continues to increase, the quantity of spare data blocks may continue to increase. Further, the quantity of open data blocks, and therefore cursors for open data blocks, may also increase. The increased spare data block maintenance may add to the overhead and cost of the memory system, which may consume an increased percentage of the overprovisioning capabilities of the memory system, as it may increase the quantity of data blocks that the memory system 205 maintains available for writing.

To reduce the quantity of maintained spare data blocks and concurrently open data blocks (among other benefits), the memory system 205 may multiplex different subsets of logical data types into the same data blocks. That is, the memory system 205 may (e.g., initially) write different types of logical data into the same data block and later separate the data into different data blocks (e.g., as part of a media management operation). For example, with reference to FIG. 2, the memory system 205 may write first data 215-*a* associated with a first logical data type, second data 215-*b* associated with a second logical data type, and third data 215-*c* associated with a third logical data type to a multiplexed data block 210-*a*. In a similar manner, the memory system 205 may write fourth data 225-*a* associated with a fourth logical data type, fifth data 225-*b* associated with a fifth logical data type, and sixth data 225-*c* associated with a sixth logical data type to a multiplexed data block 220-*a*. Additionally or alternatively, the memory system 205 may write seventh data 235-*a* associated with a seventh logical data type, eighth data 235-*b* associated with an eighth logical data type, and ninth data 235-*c* associated with a ninth logical data type to a multiplexed data block 230-*a*. Multiplexing different subsets of data may decrease the quantity of spare data blocks maintained by the memory system 205. For example, in the example of FIG. 2, instead of maintaining nine different spare data blocks (one for each logical data type), the memory system 205 may maintain three spare data blocks (one for each multiplexed data block).

The memory system 205 may multiplex different subsets of logical data types into same data blocks according to the type of memory cell associated with storing the logical data types. For example, the memory system 205 may write each type of logical data to a particular type of memory cell. In some cases, the memory system 205 may write different types of logical data to the same data block (e.g., a static SLC multiplex data block, dynamic SLC multiplex data block, a TLC multiplex data block) if the different types of logical data are associated with storage to a same type of memory cell. For example, the memory system 205 may write a first subset of logical data types (e.g., the first, second, and third logical data types corresponding to the first data 215-*a*, the second data 215-*b*, and the third data 215-*c*) to the same multiplexed data block 210-*a* based on the first subset of logical data types including logical data types associated with storage to the same type of memory cell that is included in the multiplexed data block 210-*a* (e.g., storage to static SLCs). In a similar matter, the memory system may write a second subset of logical data types (e.g., the fourth, fifth, and sixth logical data types corresponding to the fourth data 225-*a*, the fifth data 225-*b*, and the sixth data 225-*c*) to the same multiplexed data block 220-*a* based on each of the logical data types in the second subset of logical data types being associated with storage to the same type of memory cell that is included in the multiplexed data block 220-*a* (e.g., storage to dynamic SLCs). The memory system 205 may similarly write the seventh data 235-*a*, the eighth data 235-*b*, and the ninth data 235-*c* to the same multiplexed data block 230-*a* based on the multiplexed data block 230-*a* including the type of memory cell corresponding to the seventh, eighth, and ninth logical data types (e.g., TLCs). In some examples, implementing multiplexed data blocks may reduce the quantity of cursors from the total quantity of logical data types to the quantity of subsets of logical data types (e.g., the quantity of types of memory cells, the quantity of types of memory cells used in the initial writing of various logical data types).

The memory system 205 may subsequently separate the different logical data types from a multiplexed data block into respective data blocks that exclusively store data of the respective logical data type. For example, storing logical data of different types in respective data blocks may enable simpler management and accessing of the logical data. Thus, eventual sorting of the multiplexed logical data into respective data blocks may facilitate the management and accessing of the logical data. To separate logical data into a respective data block, the memory system 205 may perform a media management operation to transfer at least a portion of the data from the multiplexed block to a respective data block (e.g., separate the different logical data types as part of a garbage collection operation). For instance, with reference to FIG. 2, the memory system 205 may transfer (e.g., as part of the media management operation) the first data 215-*a* from the multiplexed data block 210-*a* to a data block 240-*a* associated with the exclusive storage of data of the first logical type. That is, the data block 240-*a* may be configured to store solely data of the first logical type and data of other logical types may be stored elsewhere. Similarly, the memory system 205 may transfer (e.g., as part of the same or different media management operations) the data 215-*b*, 215-*c*, 225-*a*. 225-*b*, 225-*c*, 235-*a*, 235-*b*, and 235-*c* to data blocks 240-*b*, 240-*c*, 245-*a*. 245-*b*, 245-*c*, 250-*a*, 250-*b*, and 250-*c*, respectively, from the corresponding multiplexed data blocks. Each of the data blocks 240, 245, and 250) may be associated with exclusive storage of a singular logical data type (e.g., the type of the logical data transferred to the data block).

In some cases, the memory system 205 may maintain statistics on the data blocks (e.g., the data blocks 210-*a*, 220-*a*, and 230-*a*) describing the various quantities and types of data written to each of the data blocks. For example, the memory system may track the quantity of data of each logical data type that is written to a multiplexed data block. For instance, with reference to FIG. 2, the memory system 205 may track respective quantities of the data 215, the data 225, and the 235 that is written to the multiplexed data blocks 210-*a*, 220-*a*, and 230-*a*, respectively. In some examples, a memory system controller (e.g., memory system controller 115 with reference to FIG. 1) may track this information and utilize it in determining whether to perform a respective media management operation to transfer (e.g., and separate out) the data. For example, the memory system 205 may perform the media management operation in response to one or more thresholds being satisfied (e.g., as described with reference to FIGS. 3A through 4B below), and the memory system 205 may use the tracked information to determine whether the one or more thresholds are satisfied. In some examples, the memory system 205 (e.g., the memory system controller) may track the information using respective counters that are incremented in response to data of a given logical data type being written to a data block.

In some cases, the memory system 205 may tag the data written to the multiplexed data blocks with metadata. For example, the memory system 205 may write first metadata to the data block 210-*a* that indicates that the first data 215-*a* has the first logical data type, second metadata to the data block 210-*a* that indicates that the second data 215-*b* has the second logical data type, and so on. In some examples, the memory system 205 may written metadata to track the information. In some examples, the memory system 205 may read the metadata in case of power loss to re-obtain lost statistics (e.g., for power loss recovery rebuilds and garbage collection operations). For example, the memory system 205 may read the metadata to re-populate respective counters used in tracking the information with corresponding values of the counters before the power loss occurred.

By decreasing the quantity of spare data blocks (e.g., the spare data blocks 210-*b*), the memory system 205 may have a reduced quantity of valid blocks (e.g., required number of valid blocks (NVB)) per plane (e.g., the plane 165) or die (e.g., the die 160). The reduction in NVB may provide additional benefits, such as reduced cost of the memory system 205, improved yield via spares and replacements, and reduced time to market for products by allowing the use of lower quality materials. Additionally, multiplexing data of different logical types into multiplexed data blocks may support increased firmware and system flexibility. For example, the memory system 205 may map new types of logical data to an existing architecture (e.g., the multiplexed data blocks), instead of creating and implementing a new cursor (e.g., data block pool) for the respective logical data type. The system flexibility may also allow for new feature innovations after the memory system architecture (e.g., a NAND architecture) is designed, as long as new trim parameters may be configured (e.g., defined). Additionally or alternatively, the multiplexed data blocks may allow for a single paradigm for data block management instead of different management approaches for different data pools.

Figure 3A:
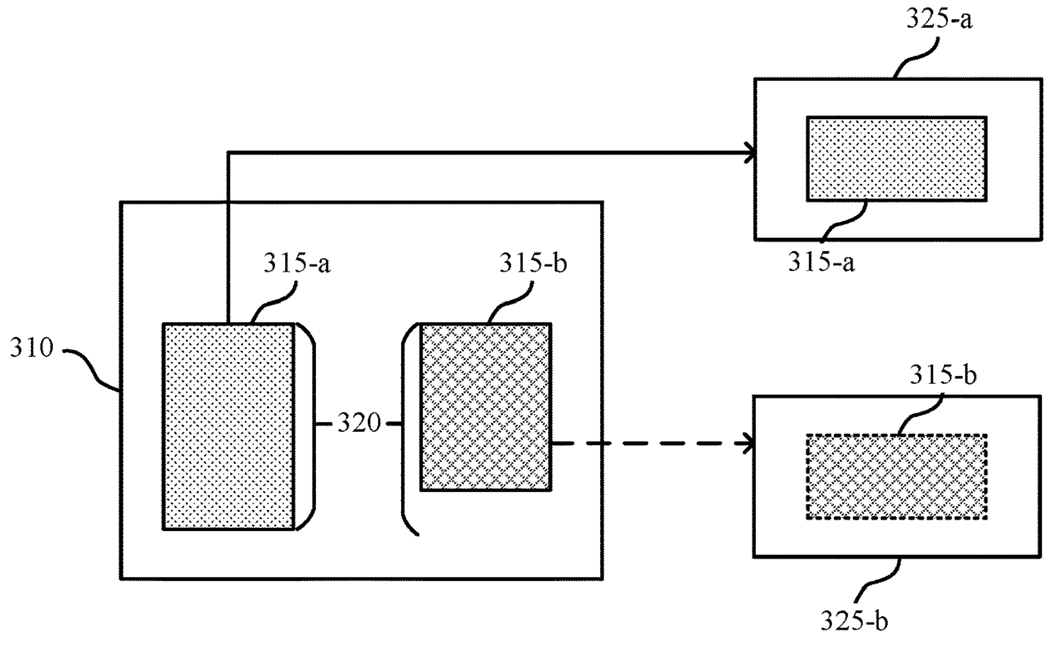
FIGS. 3A-4B illustrate examples of data management diagrams that support data type based write management techniques in accordance with examples as disclosed herein.

FIG. 3A illustrates an example of a data management diagram 300 that supports data type based write management techniques in accordance with examples as disclosed herein. The data management diagram 300 may be implemented by aspects of systems 100 or 200, as described with reference to FIGS. 1 and 2, respectively. For example, the data management diagram 300 may be implemented by a memory system, which may be an example of a memory system 110 or 205, respectively, as described with reference to FIGS. 1 and 2. The data management diagram 300 may be implemented to reduce a quantity of spare data blocks by multiplexing data of different logical data types associated with the same type of memory cell type to the same data block, and then separating the data to respective data blocks, thereby lowering the cost and overhead of the memory system, among other benefits.

The data management diagram 300 may depict a media management operation (e.g., garbage collection operation) to transfer data from a multiplexed data block 310 to a data block 325 configured to exclusively store a single type of logical data. In some cases, the memory system may trigger the media management operation based on a quantity of logical data in a multiplexed data block 310 satisfying a threshold quantity 320. For example, the memory system may include the multiplexed data block 310. The multiplexed data block 310 may include first data 315-*a* associated with a first logical data type and second data 315-*b* associated with a second logical data type. The memory system may write both the first data 315-*a* and the second data 315-*b* to the multiplexed data block 310, for example, based on the first logical data type and the second logical data type being associated with storage to a same type of memory cell.

In some cases, the memory system may determine that a first quantity of the first data 315-*a* satisfies (e.g., is greater than, is greater than or equal to) the threshold quantity 320. In response to determining that first quantity satisfies the threshold quantity 320, the memory system may perform the media management operation to transfer the first data 315-*a* to a respective data block 325-*a* associated with exclusive storage of data of the first logical type. For example, if data in multiplexed cursor blocks (e.g., the multiplexed data block 310) is large enough (e.g., the threshold quantity 320 of the first data 315-*a* has been written), the data may be garbage collected into respective blocks (e.g., separated blocks appropriate for each of the logical data types).

The memory system may determine that a quantity of the second data 315-*b* fails to satisfy (e.g., is less than, is less than or equal to) the threshold quantity 320. In some cases, the second data 315-*b* may remain in the multiplexed data block 310 even if first data 315-*a* is garbage collected (e.g., separated out of the multiplexed data block 310). That is, in some examples, the memory system may transfer the first data 315-*a* to the data block 325-*a* but may refrain from transferring the second data 315-*b* to the data block 325-*b* due to the second data 315-*b* failing to satisfy the threshold quantity 320. In some examples, the memory system may transfer (e.g., as part of a second media management operation) the second data 315-*b* at a later time after (e.g., in response to) the quantity of the second data 315-*b* satisfies the threshold quantity 320.

Alternatively, the memory system may perform a media management operation to transfer the second data 315-*b* to a respective data block 325-*b* associated with exclusive storage of data of the second logical type based on the first quantity of the first data 315-*a* satisfying the threshold quantity 320. That is, even if some of the data (e.g., the second data 315-*b*) included in the data block 310 fails to satisfy the threshold quantity 320, the memory system may transfer each of the various types of logical data stored in the data block 310 to respective data blocks 325 in response to other data included in the data block 310 (e.g., the first data 315-*a*) satisfying the threshold quantity 320. The media management operation to transfer the second data 315-*b* may be the same, or a different media management operation, as the media management operation to transfer the first data 315-*a*.

Figure 3B:
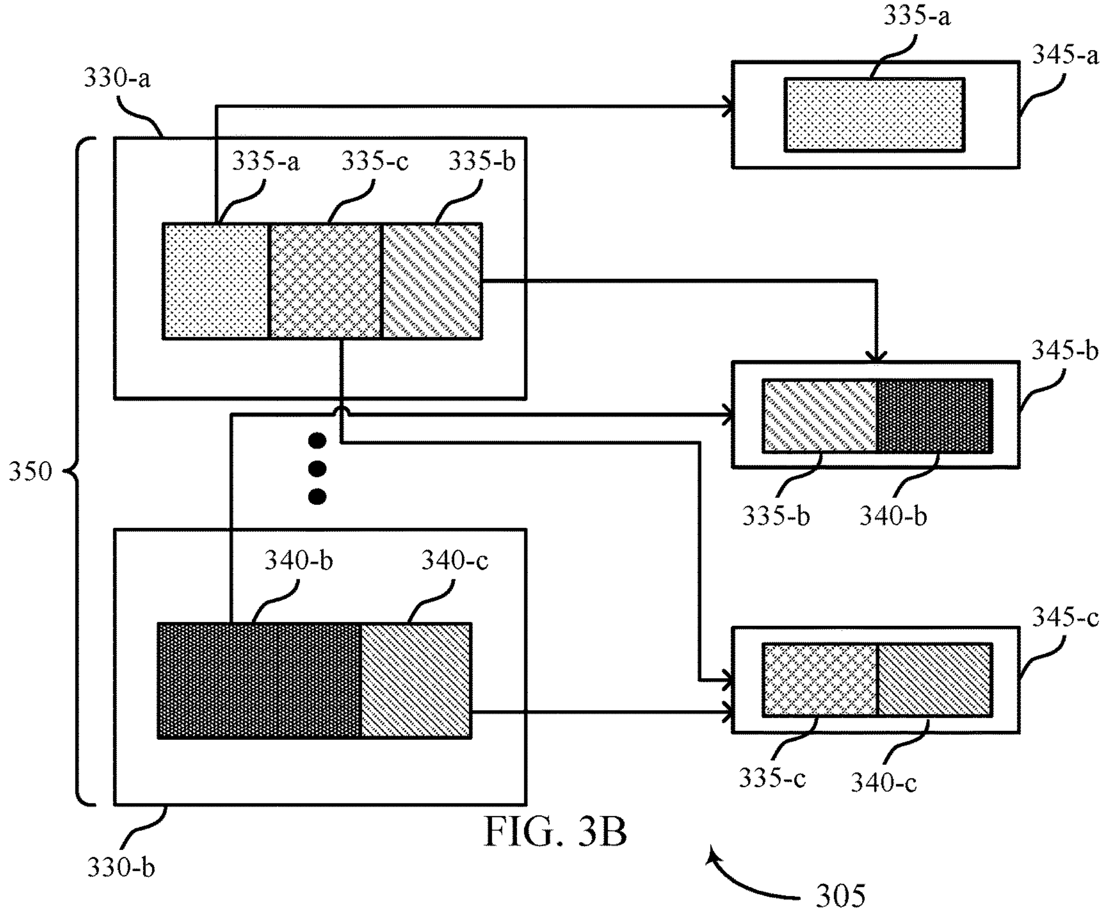

FIG. 3B illustrates an example of a data management diagram 305 that supports data type based write management techniques in accordance with examples as disclosed herein. The data management diagram 305 may be implemented by aspects of systems 100 or 200, as described with reference to FIGS. 1 and 2, respectively. For example, the data management diagram 305 may be implemented by a memory system, which may be an example of a memory system 110 or 205, as described with reference to FIGS. 1 and 2, respectively. The data management diagram 305 may be implemented to reduce a quantity of spare data blocks by multiplexing data of different logical data types associated with the same type of memory cell type to the same data block, and then separating the data to respective data blocks, thereby lowering the cost and overhead of the memory system, among other benefits.

The data management diagram 305 may depict one or more media management operations (e.g., garbage collection operations) to transfer data from respective multiplexed data blocks 330 to respective data blocks 345 configured to exclusively store a single type of logical data. In some cases, the memory system may trigger the one or more media management operations based on a quantity of filled multiplexed data blocks associated with storage of the same subset of logical types (e.g., including a same type of memory cell) satisfying (e.g., being greater than, being greater than or equal to) a threshold quantity 350. For example, the data management diagram 305 may include a first filled multiplexed data block 330-*a* up through a second filled multiplexed data block 330-*b*. Each of the filled multiplexed data blocks 330 may be the same type of data block (e.g., may each be static SLC multiplexed data blocks, dynamic SLC multiplexed data blocks, or TLC multiplexed data blocks). Although depicted as two multiplexed data blocks for illustrative purposes, the data management diagram 305 may include any quantity of multiplexed data blocks 330.

The memory system may determine that the quantity of filled multiplexed data blocks 330 of the same type (e.g., associated with storage of the same subset of logical data types) satisfies the threshold quantity 350. In response to the determination, the memory system perform one or more media management operations on the filled multiplexed data blocks 330. For instance, with reference to FIG. 3B, the memory system may determine the first multiplexed data block 330-*a* up through the second multiplexed data block 330-*b* being filled satisfies the threshold quantity 350 corresponding to a quantity of filled multiplexed data blocks of the same type.

In some examples, the threshold quantity 350 may be based on a percentage of a total quantity of data blocks of the memory system that are filled. For example, as the quantity of data blocks of the memory system that are filled increases, available storage capacity of the memory system may decrease and the performance of media management operations, such as garbage collect operations, may increase in priority. Accordingly, as the percentage of the total quantity of data blocks that are filled increases, the threshold quantity 350 may decrease, which may trigger more frequent performance of the media management operations (e.g., which may correspond to the media management operations being higher priority operations of the memory system).

In the example of FIG. 3, the filled multiplexed data block 330-*a* may include first data 335-*a* associated with a first logical data type, second data 335-*b* associated with a second logical data type, and third data 335-*c* associated with a third logical data type. As part of the one or more media management operations, the memory system may transfer the first data 335-*a* to a respective data block 345-*a* associated with exclusive storage of the first data type. Similarly, the memory system may transfer the second data 335-*b* to a respective data block 345-*b* associated with exclusive storage of the second data type and transfer the third data 335-*c* to a respective data block 345-*c* associated with exclusive storage of the third data type.

The filled multiplexed data block 330-*b* may include fourth data 340-*b* associated with the second logical data type, and fifth data 340-*c* associated with the third logical data type. As part of the one or more media management operations, the memory system may transfer the fourth data 340-*b* to the respective data block 345-*b* based on the fourth data 340-*b* and data block 345-*b* being associated with the second logical data type. Similarly, the memory system may transfer the fifth data 340-*c* to the respective data block 345-*c*. In some examples, if a data block 345 is filled as part of a media management operation, one or more other data blocks 345 of the same type may be used to store the remaining data to be transferred. For example, if the data block 345-*b* is filled as part of the transfer of the fourth data 340-*b*, the memory system may transfer a remaining portion of the fourth data 340-*b* to another data block 345 associated with the second logical data type.

Figure 4A:
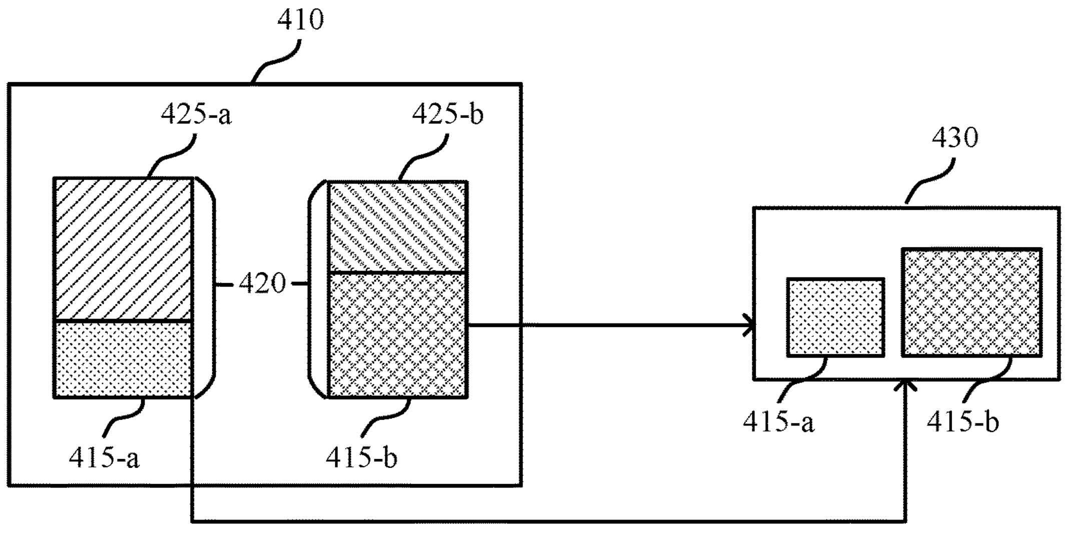

FIG. 4A illustrates an example of a data management diagram 400 that supports data type based write management techniques in accordance with examples as disclosed herein. The data management diagram 400 may be implemented by aspects of systems 100 or 200, as described with reference to FIGS. 1 and 2, respectively. For example, the data management diagram 400 may be implemented by a memory system, which may be an example of a memory system 110 or 205 as described with reference to FIGS. 1 and 2, respectively.

The data management diagram 400 may depict a media management operation (e.g., garbage collection operation) to transfer data from a multiplexed data block to another multiplexed data block. For example, in transferring data between data blocks as described herein, the memory system may transfer valid data of a data block while not transferring invalid data (e.g., in accordance with garbage collection techniques). In some examples, the quantity of valid data to be transferred may be small such that the memory system determines to transfer the valid data to another multiplexed data block instead of to a respective data block for exclusive storage of the valid data (e.g., mixed-to-mixed garbage collection for stale data that is not ready to be separated to a respective data block).

For example, the memory system may write data of a first logical type and data of a second logical type to a first multiplexed data block 410. Over time, portions of the data may be overwritten (e.g., updated, invalidated) such that these portions may become invalid. The memory system may determine to garbage collect the first multiplexed data block 410, and the memory system may determine that quantities of valid data 415 of each respective logical data type may fail to satisfy a threshold quantity 420 corresponding to a quantity of valid data. For instance, with reference to FIG. 4A, the first multiplexed data block 410 may contain a first quantity of a valid data 415-*a* and a first quantity of invalid data 425-*a*, both of which are associated with the first logical data type. The first multiplexed data block 410 may also contain a second quantity of valid data 415-*b* and a second quantity of invalid data 425-*b*, both of which are associated with the second logical data type. In some cases, the first quantity of valid data 415-*a* and the second quantity of valid data 415-*b* may both fail to satisfy a threshold quantity 420 of valid data 415. In response to the quantities of valid data 415 failing to satisfy the threshold quantity 420, the memory system may transfer (e.g., as part of a media management operation) the first quantity of valid data 415-*a* and the second quantity of valid data 415-*b* to a second multiplexed data block 430 (e.g., instead of to respective data blocks associated with exclusive storage of the respective logical data types).

Figure 4B:
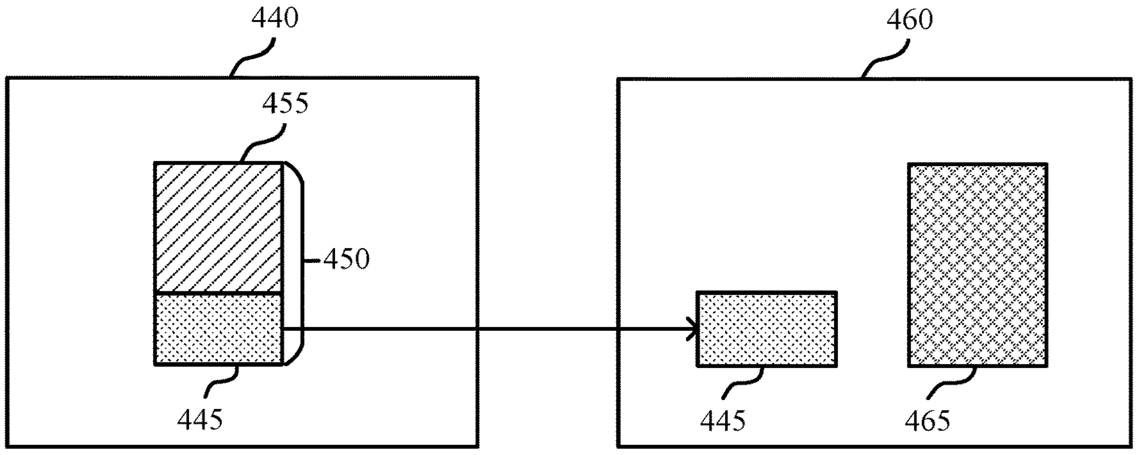

FIG. 4B illustrates an example of a data management diagram 405 that supports data type based write management techniques in accordance with examples as disclosed herein. The data management diagram 405 may be implemented by aspects or operations of systems 100 or 200, as described with reference to FIGS. 1 and 2, respectively. For example, the data management diagram 405 may be implemented by a memory system, which may be an example of a memory system 100 or 205, respectively, as described with reference to FIGS. 1 and 2.

The data management diagram 405 may depict a media management operation (e.g., garbage collection operation) to transfer data from a data block associated with exclusive storage of a single logical data type to a multiplexed data block. For instance, the memory system may transfer valid data from a data block 440 to a multiplexed data block 460. For example, the memory system may garbage collect a quantity of valid data 445 from a respective (e.g., dedicated) data block 440 to a multiplexed data block 460.

The data block 440 may be associated with the exclusive storage of a first logical data type. The data block 440 may contain the valid data 445 associated with the first logical data type and invalid data 455 also associated with the first logical data type. The memory system may determine to perform a media management operation (e.g., a garbage collect operation) on the data block 440 and may determine that the quantity of the valid data 445 fails to satisfy a threshold quantity 450 corresponding to a quantity of valid data. The memory system may transfer the valid data 445 to a multiplexed data block 460 in response to the valid data 445 failing to satisfy the threshold quantity 450. The multiplexed data block 460 may also contain a data 465 associated with a second logical data type.

The valid data 445 may have been previously separated out and transferred to its own exclusive data block (e.g., the data block 440). In some cases, the memory system may update and write portions of the valid data 445 to other locations. Updating and writing the portions of the valid data 445 may invalidate those portions of the valid data 445 in the data block 440. The memory system may determine to garbage collect the data block 440. If the remaining portion of the valid data 445 fails to satisfy the threshold quantity 450, the memory system may garbage collect the valid data 445 to the multiplexed data block 460 associated with a subset of logical data types including the first logical data type.

Figure 5:
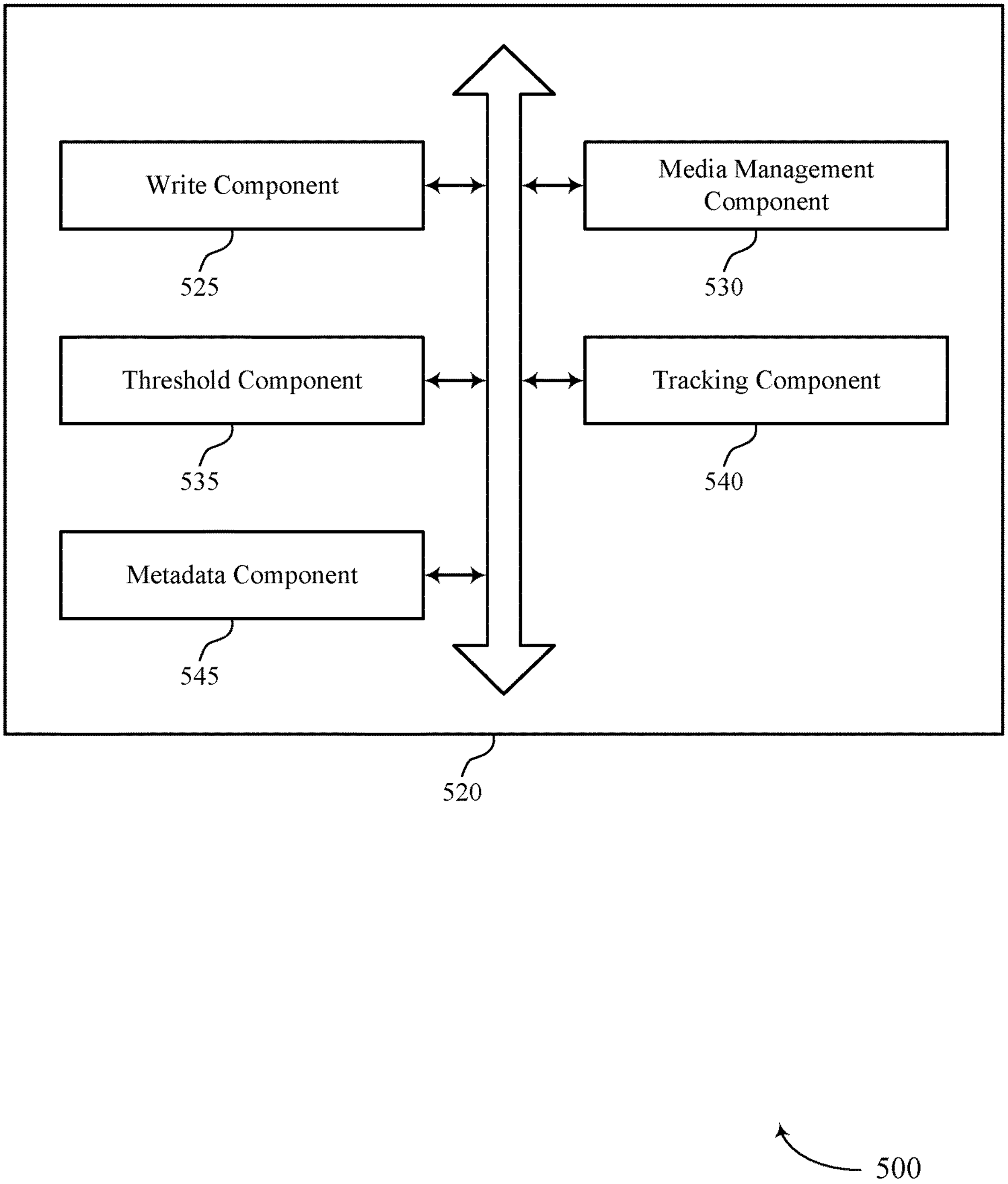
FIG. 5 illustrates a block diagram of a memory system that supports data type based write management techniques in accordance with examples as disclosed herein.

FIG. 5 illustrates a block diagram 500 of a memory system 520 that supports data type based write management techniques in accordance with examples as disclosed herein. The memory system 520 may be an example of aspects of a memory system as described with reference to FIGS. 1 through 5. The memory system 520, or various components thereof, may be an example of means for performing various aspects of data type based write management techniques as described herein. For example, the memory system 520 may include a write component 525, a media management component 530, a threshold component 535, a tracking component 540, a metadata component 545, or any combination thereof. Each of these components may communicate, directly or indirectly, with one another (e.g., via one or more buses).

The write component 525 may be configured as or otherwise support a means for writing first data to a first data block of a memory system based at least in part on a first logical type of the first data. In some examples, the write component 525 may be configured as or otherwise support a means for writing second data to the first data block based at least in part on a second logical type of the second data, the first logical type and the second logical type associated with storage to a same type of memory cell. The media management component 530 may be configured as or otherwise support a means for performing, after writing the first data and the second data to the first data block, a media management operation to transfer at least the first data to a second data block of the memory system.

In some examples, to support performing the media management operation, the media management component 530 may be configured as or otherwise support a means for transferring the second data to a third data block of the memory system, where the second data block is associated with exclusive storage of data of the first logical type and the third data block is associated with exclusive storage of data of the second logical type.

In some examples, the write component 525 may be configured as or otherwise support a means for writing third data to a third data block based at least in part on a third logical type of the third data being associated with storage to a second type of memory cell different than the type of memory cell associated with the first logical type and the second logical type.

In some examples, the threshold component 535 may be configured as or otherwise support a means for determining, based at least in part on writing the first data to the first data block, whether a threshold quantity of data having the first logical type has been written to one or more data blocks associated with the type of memory cell and including the first data block, where the media management operation is performed based at least in part on the threshold quantity of data having been written.

In some examples, the threshold component 535 may be configured as or otherwise support a means for determining, based at least in part on writing the second data to the first data block, whether a second threshold quantity of data having the second logical type has been written to the one or more data blocks, where the second data is transferred to a third data block of the memory system as part of the media management operation based at least in part on the second threshold quantity of data having been written.

In some examples, the threshold component 535 may be configured as or otherwise support a means for determining, based at least in part on writing the first data and the second data, whether a quantity of filled data blocks associated with storage of the first logical type and the second logical type satisfies a threshold quantity, where a filled data block excludes empty pages of memory cells, and where the media management operation is performed based at least in part on the quantity of filled data blocks satisfying the threshold quantity.

In some examples, the threshold quantity is based at least in part on a percentage of a total quantity of data blocks of the memory system that are filled.

In some examples, the tracking component 540 may be configured as or otherwise support a means for tracking respective quantities of data of respective logical types written to data blocks of the memory system associated with respective subsets of logical types, where the media management operation is performed based at least in part on the tracking.

In some examples, the metadata component 545 may be configured as or otherwise support a means for writing first metadata to the first data block, the first metadata indicating that the first data has the first logical type. In some examples, the metadata component 545 may be configured as or otherwise support a means for writing second metadata to the first data block, the second metadata indicating that the second data has the second logical type.

In some examples, the write component 525 may be configured as or otherwise support a means for writing third data to a third data block of the memory system based at least in part on a third logical type of the third data. In some examples, the write component 525 may be configured as or otherwise support a means for writing fourth data to the third data block based at least in part on a fourth logical type of the fourth data, the third logical type and the fourth logical type associated with storage to a second type of memory cell. In some examples, the media management component 530 may be configured as or otherwise support a means for determining to perform a second media management operation to transfer valid data from the third data block. In some examples, the media management component 530 may be configured as or otherwise support a means for performing the second media management operation to transfer, to a fourth data block of the memory system, a portion of the third data including a first quantity of valid data and a portion of the fourth data including a second quantity of valid data based at least in part on the first quantity of valid data and the second quantity of valid data failing to satisfy a threshold.

In some examples, the media management component 530 may be configured as or otherwise support a means for determining to perform a second media management operation to transfer a portion of the first data including valid data from the second data block. In some examples, the media management component 530 may be configured as or otherwise support a means for performing the second media management operation to transfer the portion of the first data from the second data block to the first data block based at least in part on a quantity of the valid data failing to satisfy a threshold.

In some examples, the first logical type includes data associated with a first likelihood of being overwritten within a duration after being written, data associated with a second likelihood of being overwriting within the duration, write booster data, user data, data associated with a first zone of the memory system, RAIN parity data, firmware data, or data associated with operation of the memory system. In some examples, the second logical type includes the data associated with the first likelihood of being overwritten within the duration, the data associated with the second likelihood of being overwriting within the duration, the write booster data, the user data, data associated with a second zone of the memory system, the RAIN parity data, the firmware data, or the data associated with operation of the memory system, the second logical type being different than the first logical type.

In some examples, the type of memory cell includes a single level memory cell associated with a first access latency, a single level memory cell associated with a second access latency that is less than the first access latency, or a multiple-level memory cell.

Figure 6:
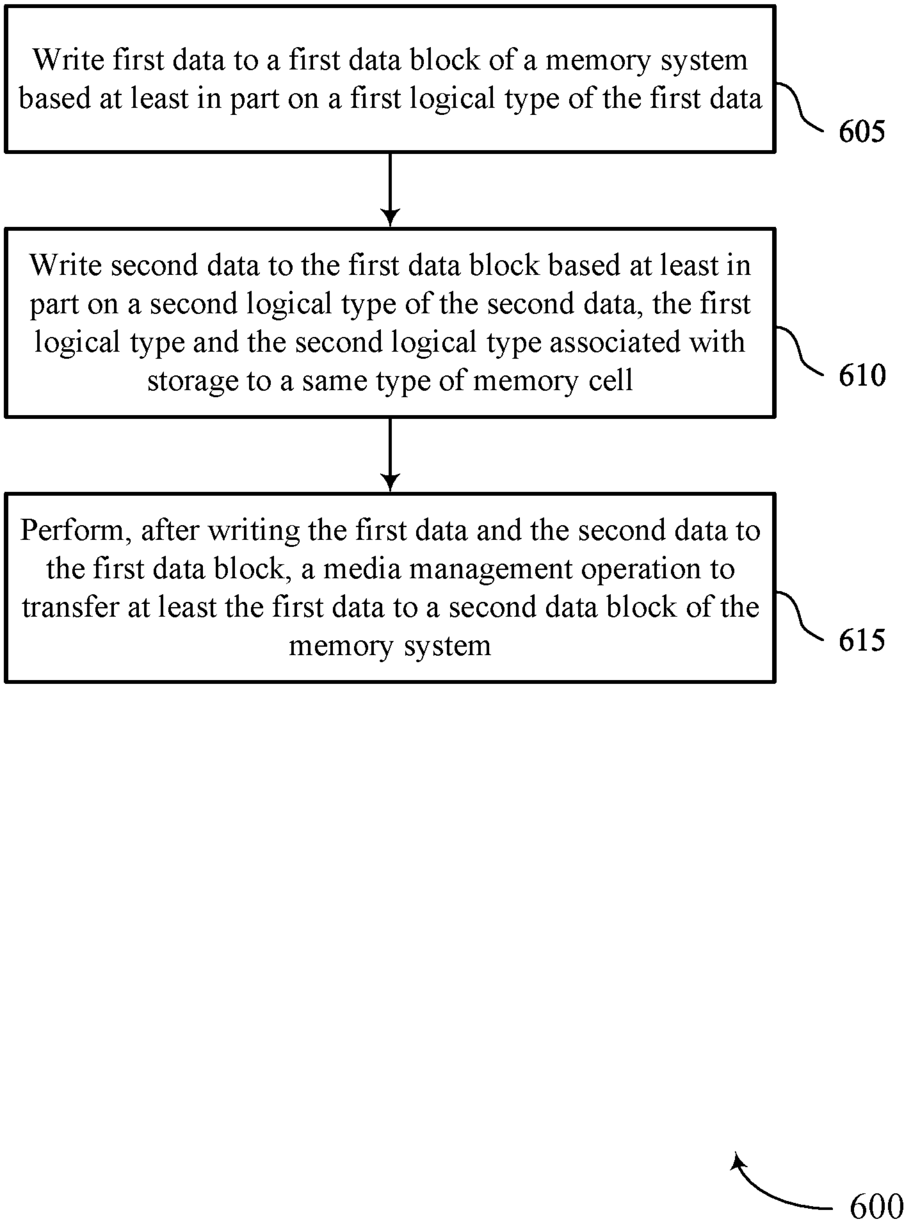
FIG. 6 illustrates a flowchart showing a method or methods that support data type based write management techniques in accordance with examples as disclosed herein.

FIG. 6 illustrates a flowchart showing a method 600 that supports data type based write management techniques in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include writing first data to a first data block of a memory system based at least in part on a first logical type of the first data. The operations of 605 may be performed in accordance with examples as disclosed herein. In some examples, aspects of the operations of 605 may be performed by a write component 525 as described with reference to FIG. 5.

At 610, the method may include writing second data to the first data block based at least in part on a second logical type of the second data, the first logical type and the second logical type associated with storage to a same type of memory cell. The operations of 610 may be performed in accordance with examples as disclosed herein. In some examples, aspects of the operations of 610 may be performed by a write component 525 as described with reference to FIG. 5.

At 615, the method may include performing, after writing the first data and the second data to the first data block, a media management operation to transfer at least the first data to a second data block of the memory system. The operations of 615 may be performed in accordance with examples as disclosed herein. In some examples, aspects of the operations of 615 may be performed by a media management component 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for writing first data to a first data block of a memory system based at least in part on a first logical type of the first data; writing second data to the first data block based at least in part on a second logical type of the second data, the first logical type and the second logical type associated with storage to a same type of memory cell; and performing, after writing the first data and the second data to the first data block, a media management operation to transfer at least the first data to a second data block of the memory system.

Aspect 2: The method, apparatus, or non-transitory computer-readable medium of aspect 1, where performing the media management operation includes operations, features, circuitry, logic, means, or instructions, or any combination thereof for transferring the second data to a third data block of the memory system, where the second data block is associated with exclusive storage of data of the first logical type and the third data block is associated with exclusive storage of data of the second logical type.

Aspect 3: The method, apparatus, or non-transitory computer-readable medium of any of aspects 1 through 2, further including operations, features, circuitry, logic, means, or instructions, or any combination thereof for writing third data to a fourth data block based at least in part on a third logical type of the third data being associated with storage to a second type of memory cell different than the type of memory cell associated with the first logical type and the second logical type.

Aspect 4: The method, apparatus, or non-transitory computer-readable medium of any of aspects 1 through 3, further including operations, features, circuitry, logic, means, or instructions, or any combination thereof for determining, based at least in part on writing the first data to the first data block, whether a threshold quantity of data having the first logical type has been written to one or more data blocks associated with the type of memory cell and including the first data block, where the media management operation is performed based at least in part on the threshold quantity of data having been written.

Aspect 5: The method, apparatus, or non-transitory computer-readable medium of aspect 4, further including operations, features, circuitry, logic, means, or instructions, or any combination thereof for determining, based at least in part on writing the second data to the first data block, whether a second threshold quantity of data having the second logical type has been written to the one or more data blocks, where the second data is transferred to a third data block of the memory system as part of the media management operation based at least in part on the second threshold quantity of data having been written.

Aspect 6: The method, apparatus, or non-transitory computer-readable medium of any of aspects 1 through 5, further including operations, features, circuitry, logic, means, or instructions, or any combination thereof for determining, based at least in part on writing the first data and the second data, whether a quantity of filled data blocks associated with storage of the first logical type and the second logical type satisfies a threshold quantity, where a filled data block excludes empty pages of memory cells, and where the media management operation is performed based at least in part on the quantity of filled data blocks satisfying the threshold quantity.

Aspect 7: The method, apparatus, or non-transitory computer-readable medium of aspect 6, where the threshold quantity is based at least in part on a percentage of a total quantity of data blocks of the memory system that are filled.

Aspect 8: The method, apparatus, or non-transitory computer-readable medium of any of aspects 1 through 7, further including operations, features, circuitry, logic, means, or instructions, or any combination thereof for tracking respective quantities of data of respective logical types written to data blocks of the memory system associated with respective subsets of logical types, where the media management operation is performed based at least in part on the tracking.

Aspect 9: The method, apparatus, or non-transitory computer-readable medium of any of aspects 1 through 8, further including operations, features, circuitry, logic, means, or instructions, or any combination thereof for writing first metadata to the first data block, the first metadata indicating that the first data has the first logical type and writing second metadata to the first data block, the second metadata indicating that the second data has the second logical type.

Aspect 10: The method, apparatus, or non-transitory computer-readable medium of any of aspects 1 through 9, further including operations, features, circuitry, logic, means, or instructions, or any combination thereof for writing fourth data to a fourth data block of the memory system based at least in part on a fourth logical type of the fourth data; writing fifth data to the fourth data block based at least in part on a fifth logical type of the fifth data, the fourth logical type and the fifth logical type associated with storage to a second type of memory cell; determining to perform a second media management operation to transfer valid data from the fourth data block; and performing the second media management operation to transfer, to a fifth data block of the memory system, a portion of the fourth data including a first quantity of valid data and a portion of the fifth data including a second quantity of valid data based at least in part on the first quantity of valid data and the second quantity of valid data failing to satisfy a threshold.

Aspect 11: The method, apparatus, or non-transitory computer-readable medium of any of aspects 1 through 10, further including operations, features, circuitry, logic, means, or instructions, or any combination thereof for determining to perform a second media management operation to transfer a portion of the first data including valid data from the second data block and performing the second media management operation to transfer the portion of the first data from the second data block to the first data block based at least in part on a quantity of the valid data failing to satisfy a threshold.

Aspect 12: The method, apparatus, or non-transitory computer-readable medium of any of aspects 1 through 11, where the first logical type includes data associated with a first likelihood of being overwritten within a duration after being written, data associated with a second likelihood of being overwriting within the duration, write booster data, user data, data associated with a first zone of the memory system, RAIN parity data, firmware data, or data associated with operation of the memory system and the second logical type includes the data associated with the first likelihood of being overwritten within the duration, the data associated with the second likelihood of being overwriting within the duration, the write booster data, the user data, data associated with a second zone of the memory system, the RAIN parity data, the firmware data, or the data associated with operation of the memory system, the second logical type being different than the first logical type.

Aspect 13: The method, apparatus, or non-transitory computer-readable medium of any of aspects 1 through 12, where the type of memory cell includes a single level memory cell associated with a first access latency, a single level memory cell associated with a second access latency that is less than the first access latency, or a multiple-level memory cell.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as any combination of computing devices (e.g., any combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

a memory device; and a controller coupled with the memory device and configured to cause the apparatus to:

write first data to a first data block of a memory system based at least in part on a first logical type of the first data;

write second data to the first data block based at least in part on a second logical type of the second data, the first logical type and the second logical type associated with storage to a type of memory cell;

increment, in response to writing the first data, a first counter associated with tracking a first quantity of data written to the first data block that is of the first logical type;

increment, in response to writing the second data, a second counter associated with tracking a second quantity of data written to the first data block that is of the second logical type;

perform, after writing the first data and the second data to the first data block and based at least in part on the first quantity of data written to the first data block that is of the first logical type exceeding a threshold quantity, a media management operation to transfer at least the first data to a second data block of the memory system; and transfer the second data to a third data block based at least in part on the second quantity of data written to the first data block that is of the second logical type exceeding the threshold quantity.

2. The apparatus of claim 1, wherein the controller is further configured to cause the apparatus to:

write third data to a fourth data block based at least in part on a third logical type of the third data being associated with storage to a second type of memory cell different than the type of memory cell associated with the first logical type and the second logical type.

3. The apparatus of claim 1, wherein the controller is further configured to cause the apparatus to:

determine, based at least in part on writing the first data to the first data block to which the second data is also written, whether a second threshold quantity of data having the first logical type has been written to one or more data blocks associated with the type of memory cell and comprising the first data block, wherein the media management operation is performed based at least in part on the second threshold quantity of data having been written.

4. The apparatus of claim 3, wherein the controller is further configured to cause the apparatus to:

determine, based at least in part on writing the second data to the first data block, whether a third threshold quantity of data having the second logical type has been written to the one or more data blocks, wherein the second data is transferred to the third data block as part of the media management operation based at least in part on the third threshold quantity of data having been written.

5. The apparatus of claim 1, wherein the controller is further configured to cause the apparatus to:

determine, based at least in part on writing the first data and the second data, whether a quantity of filled data blocks associated with storage of the first logical type and the second logical type satisfies a second threshold quantity, wherein a filled data block excludes empty pages of memory cells, and wherein the media management operation is performed based at least in part on the quantity of filled data blocks satisfying the second threshold quantity.

6. The apparatus of claim 5, wherein the second threshold quantity is based at least in part on a percentage of a total quantity of data blocks of the memory system that are filled.

7. The apparatus of claim 1, wherein the controller is further configured to cause the apparatus to:

write first metadata to the first data block, the first metadata indicating that the first data has the first logical type; and write second metadata to the first data block, the second metadata indicating that the second data has the second logical type.

8. The apparatus of claim 1, wherein the controller is further configured to cause the apparatus to:

write third data to a fourth data block of the memory system based at least in part on a third logical type of the third data;

write fourth data to the fourth data block based at least in part on a fourth logical type of the fourth data, the third logical type and the fourth logical type associated with storage to a second type of memory cell;

determine to perform a second media management operation to transfer valid data from the fourth data block; and perform the second media management operation to transfer, to a fifth data block of the memory system, a portion of the third data comprising a first quantity of valid data and a portion of the fourth data comprising a second quantity of valid data based at least in part on the first quantity of valid data and the second quantity of valid data failing to satisfy a threshold.

9. The apparatus of claim 1, wherein the controller is further configured to cause the apparatus to:

determine to perform a second media management operation to transfer a portion of the first data comprising valid data from the second data block; and perform the second media management operation to transfer the portion of the first data from the second data block to the first data block based at least in part on a quantity of the valid data failing to satisfy a threshold.

10. The apparatus of claim 1, wherein:

the first logical type comprises data associated with a first likelihood of being overwritten within a duration after being written, data associated with a second likelihood of being overwritten within the duration, write booster data, user data, data associated with a first zone of the memory system, redundant array of independent not-and (NAND) parity data, firmware data, or data associated with operation of the memory system, and the second logical type comprises the data associated with the first likelihood of being overwritten within the duration, the data associated with the second likelihood of being overwritten within the duration, the write booster data, the user data, data associated with a second zone of the memory system, the redundant array of independent NAND parity data, the firmware data, or the data associated with operation of the memory system, the second logical type being different than the first logical type.

11. The apparatus of claim 1, wherein the type of memory cell comprises a single level memory cell associated with a first access latency, a single level memory cell associated with a second access latency that is less than the first access latency, or a multiple-level memory cell.

12. A non-transitory computer-readable medium storing code comprising instructions which, when executable by a processor of an electronic device, cause the electronic device to:

write first data to a first data block of a memory system based at least in part on a first logical type of the first data;

write second data to the first data block based at least in part on a second logical type of the second data, the first logical type and the second logical type associated with storage to a type of memory cell;

increment, in response to writing the first data, a first counter associated with tracking a first quantity of data written to the first data block that is of the first logical type;

increment, in response to writing the second data, a second counter associated with tracking a second quantity of data written to the first data block that is of the second logical type;

perform, after writing the first data and the second data to the first data block and based at least in part on the first quantity of data written to the first data block that is of the first logical type exceeding a threshold quantity, a media management operation to transfer at least the first data to a second data block of the memory system; and transfer the second data to a third data block based at least in part on the second quantity of data written to the first data block that is of the second logical type exceeding the threshold quantity.

13. The non-transitory computer-readable medium of claim 12, wherein the instructions, when executable by the processor of the electronic device, further cause the electronic device to:

write third data to a fourth data block based at least in part on a third logical type of the third data being associated with storage to a second type of memory cell different than the type of memory cell associated with the first logical type and the second logical type.

14. The non-transitory computer-readable medium of claim 12, wherein the instructions, when executable by the processor of the electronic device, further cause the electronic device to:

determine, based at least in part on writing the first data to the first data block to which the second data is also written, whether a second threshold quantity of data having the first logical type has been written to one or more data blocks associated with the type of memory cell and comprising the first data block, wherein the media management operation is performed based at least in part on the second threshold quantity of data having been written.

15. The non-transitory computer-readable medium of claim 14, wherein the instructions, when executable by the processor of the electronic device, further cause the electronic device to:

determine, based at least in part on writing the second data to the first data block, whether a third threshold quantity of data having the second logical type has been written to the one or more data blocks, wherein the second data is transferred to the third data block as part of the media management operation based at least in part on the third threshold quantity of data having been written.

16. The non-transitory computer-readable medium of claim 12, wherein the instructions are further executable by the processor to:

determine, based at least in part on writing the first data and the second data, whether a quantity of filled data blocks associated with storage of the first logical type and the second logical type satisfies a second threshold quantity, wherein a filled data block excludes empty pages of memory cells, and wherein the media management operation is performed based at least in part on the quantity of filled data blocks satisfying the second threshold quantity.

17. A method, comprising:

writing first data to a first data block of a memory system based at least in part on a first logical type of the first data;

writing second data to the first data block based at least in part on a second logical type of the second data, the first logical type and the second logical type associated with storage to a type of memory cell;

incrementing, in response to writing the first data, a first counter associated with tracking a first quantity of data written to the first data block that is of the first logical type;

incrementing, in response to writing the second data, a second counter associated with tracking a second quantity of data written to the first data block that is of the second logical type;

performing, after writing the first data and the second data to the first data block and based at least in part on the first quantity of data written to the first data block that is of the first logical type exceeding a threshold quantity, a media management operation to transfer at least the first data to a second data block of the memory system; and transferring the second data to a third data block based at least in part on the second quantity of data written to the first data block that is of the second logical type exceeding the threshold quantity.

18. The apparatus of claim 1, wherein:

the first logical type is associated with write booster data, user data, redundant array of independent not-and (NAND) parity data, firmware data, or data associated with operation of the memory system, and the second logical type is associated with the write booster data, the user data, the redundant array of independent NAND parity data, the firmware data, or the data associated with operation of the memory system, the second logical type being different than the first logical type.

19. The apparatus of claim 1, wherein the first logical type and the second logical type are written to the first data block based at least in part on the second data block corresponding to the type of memory cell and based at least in part on the third data block corresponding to the type of memory cell.

* * * * *